(12) United States Patent
Chambers et al.

(10) Patent No.: US 7,643,999 B2
(45) Date of Patent: Jan. 5, 2010

(54) MICROPHONE FEEDBACK AND CONTROL

(75) Inventors: Robert L. Chambers, Sammamish, WA (US); Oliver Scholz, Kirkland, WA (US); Oscar E. Murillo, Seattle, WA (US); David Mowatt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 10/996,770

(22) Filed: Nov. 24, 2004

(65) Prior Publication Data

US 2006/0111916 A1    May 25, 2006

(51) Int. Cl.
*G10L 21/06*    (2006.01)

(52) U.S. Cl. .................. 704/276; 715/788; 715/809; 345/800; 345/809

(58) Field of Classification Search .............. 704/231, 704/270, 276, 272; 715/788, 809; 345/800, 345/809

See application file for complete search history.

(56) References Cited

U.S. PATENT DOCUMENTS 6,971,068 B2 * 11/2005 Bates et al. .................. 715/788
7,028,265 B2 *  4/2006 Kuromusha et al. ......... 715/788

* cited by examiner

*Primary Examiner*—Huyen X. Vo

(57) ABSTRACT

A system and method for positioning a software User Interface (UI) window on a display screen is provided, wherein the method includes displaying the software UI window on the display screen and identifying at least one suitable location on the display screen responsive to an active target window area of a target application UI window. The method further includes determining whether the software UI window is disposed at the at least one suitable location on the display screen and if the software UI window is disposed in a location other than the at least one suitable location on the display screen, positioning the software UI window at the at least one suitable location on the display screen.

21 Claims, 20 Drawing Sheets

MICROPHONE FEEDBACK AND CONTROL

FIELD OF THE INVENTION

The present invention relates generally to a software user interface component and more particularly to a method for implementing a User Interface (UI) for a speech recognition application operating in a graphical operating system.

BACKGROUND OF THE INVENTION

Speech is perhaps the oldest form of human communication and many scientists now believe that the ability to communicate through speech is inherently provided in the biology of the human brain. Thus, it has been a long-sought goal to allow users to communicate with computers using a Natural User Interface (NUI), such as speech. In fact, recently great strides have been made in obtaining this goal. For example, some computers now include speech recognition applications that allow a user to verbally input both commands for operating the computer and dictation to be converted into text. These applications typically operate by periodically recording sound samples taken through a microphone, analyzing the samples to recognize the phonemes being spoken by the user and identifying the words made up by the spoken phonemes.

While speech recognition is becoming more commonplace, there are still some disadvantages to using conventional speech recognition applications that tend to frustrate the experienced user and alienate the novice or inexperienced user. One such disadvantage involves the interaction between the speaker and the computer. For example, with human interaction, people tend to control their speech based upon the reaction that they perceive in a listener. As such, during a conversation, a listener may provide feedback by nodding or making vocal responses, such as "yes" or "uh-huh", to indicate that he or she understands what is being said to them. Additionally, if the listener does not understand what is being said to them, the listener may take on a quizzical expression, lean forward, or give other vocal or non-vocal cues. In response to this feedback, the speaker will typically change the way he or she is speaking and in some cases, the speaker may speak more slowly, more loudly, pause more frequently, or ever repeat a statement, usually without the listener even realizing that the speaker is changing the way they are interacting with the listener. Thus, feedback during a conversation is a very important element that informs the speaker as to whether they are being understood or not understood by the listener. Unfortunately however, conventional voice recognition applications are not yet able to provide this type of "Natural User Interface (NUI)" feedback response to speech inputs/commands facilitated by the man-machine interface.

Currently, voice recognition applications have achieved an accuracy rate of approximately 90% to 98%. This means that when a user dictates into a document using a typical voice recognition application their speech will be accurately recognized by the voice recognition application approximately 90% to 98% of the time. As such, out of every one hundred (100) letters recorded by the voice recognition application, approximately two (2) to ten (10) letters will have to be corrected. Thus, because the accuracy rate of speech recognition can vary so much, it is essential that the voice recognition application provide feedback to the user.

One method to provide this feedback involves utilizing a Graphical User Interface (GUI) to provide feedback in the form of a dialog box during active dictation by the user. Referring to FIG. 1, a screen of a display device 100 is shown with an active Microphone User Interface (UI) dialog box 102 along with the UI window 104 for the application being dictated to, wherein in this case the user is entering a "path" into the address box 106 of the "Run" module 108 of a Windows® operating environment. As shown, as the user dictates to the voice recognition application, what the user vocalizes is displayed within the Microphone UI dialog box 102. If the voice recognition application does not recognize what the user vocalized, the voice recognition application may use the Microphone UI dialog box 102 to display a request to repeat the vocalized word or letter. The Microphone UI dialog box 102 therefore provides a vehicle for the voice recognition application to communicate important feedback to the user during the data/command entry phase.

However, one disadvantage with this method of providing feedback involves the novice or inexperienced user. Typically, the novice user of desktop speech recognition applications have many very basic requirements as they learn to use speech recognition as a new way to interact with their Personal Computer (PC). Common requirements include determining if the microphone is turned on so that the computer can "hear" the user dictating and if the computer did "hear" the user dictating, what did the computer "hear" the user say? Additionally, how can the user turn the microphone on and/or off? All this is further complicated by the fact that Speech Recognition applications can be used to control any application which can be run on the computer (e.g. Microsoft® Word, Adobe Acrobat®, Microsoft®, Wordpad and Microsoft® Excel). Unfortunately however, when a user has multiple active dialog windows open simultaneously, it is easy for one window to block other open windows and as such, there is no good "one place fits all location" where the dialog box may be placed.

To address this issue, existing speech recognition applications have placed their feedback dialog components on the extremities of the screen (as a bar along the top of the screen, over the title bar, or in the taskbar) and although this works acceptably well for experienced users, this approach does not work very well for the novice user. One reason for this is that if the feedback dialog component is located in the top left hand side of the display device and the user is working at the bottom right hand side of the display device, the user will miss a significant amount of feedback information being provided by the feedback dialog component. This is because the user will be focusing on the wrong part of the display device, i.e. where the feedback dialog component is not in focus, and the only way to get this information is to deliberately change where the eyes are focusing. Thus, the only way for a user to see feedback information is to dart their eyes back and forth from one end of the display device to the other. As a result, novice users can be surprised to find themselves in states where the computer is not listening (i.e. the microphone is turned off, or where their commands were not recognized, leading to frustration and a feeling of being out of control.

Although attempts were made to address this problem by placing the feedback dialog box in proximity to where the user is looking, other problems were introduced. Specifically, when the feedback dialog component was placed in proximity to where the user was looking, it was noticed that the feedback dialog box could be placed in the way of where the user wants to see or click, thereby forcing the user to move the feedback dialog box out of the way before proceeding. For example, referring to FIG. 2 showing a display device 200, consider the situation in which the user has the options dialog window 202 open and is focused on the "Startup Task Pane" checkbox 204. If the feedback dialog component 206, shown as the red outline, is placed in proximity to where the user is looking, i.e. the "Startup Task Pane" checkbox 204 as shown, the feedback dialog component 206 will likely obstruct adjacent controls such as the "Smart tag" checkbox, the "Animated text" checkbox, the "Windows in Taskbar" checkbox and the "Field codes" checkbox. As such, this type of "floating component" is undesirable because it tends to obstruct existing controls and may actually exacerbate an already existing problem.

SUMMARY OF THE INVENTION

A method for positioning a software User Interface (UI) window on a display screen is provided, wherein the method includes displaying the software UI window on the display screen and identifying at least one suitable location on the display screen responsive to an active target window area of a target application UI window. The method further includes determining whether the software UI window is disposed at the at least one suitable location on the display screen and if the software UI window is disposed in a location other than the at least one suitable location on the display screen, positioning the software UI window at the at least one suitable location on the display screen A system for implementing a method for positioning a software User Interface (UI) window on a display screen is provided, wherein the system includes a storage device for storing at least one target software application. The system also includes an input device for entering commands into the system, a display device, wherein the display device includes the display screen for displaying the software UI window and a processing device. The processing device is disposed to be in communication with the storage device, the input device and the display device, such that the processing device receives instructions to cause the software UI window to be displayed on the display screen and implements the at least one target software application via the storage device.

A machine-readable computer program code is provided, wherein the program code includes instructions for causing a processing device to implement a method for positioning a software User Interface (UI) window on a display screen. The method includes displaying the software UI window on the display screen and identifying at least one suitable location on the display screen responsive to an active target window area of a target application UI window. The method further includes determining whether the software UI window is disposed at the at least one suitable location on the display screen and if the software UI window is disposed in a location other than the at least one suitable location on the display screen, positioning the software UI window at the at least one suitable location on the display screen.

A medium encoded with a machine-readable computer program code is provided, wherein the program code includes instructions for causing a controller to implement a method for positioning a software User Interface (UI) window on a display screen. The method includes displaying the software UI window on the display screen and identifying at least-one suitable location on the display screen responsive to an active target window area of a target application UI window. The method further includes determining whether the software UI window is disposed at the at least one suitable location on the display screen and if the software UI window is disposed in a location other than the at least one suitable location on the display screen, positioning the software UI window at the at least one suitable location on the display screen.

BRIEF DESCRIPTION OF THE FIGURES

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

Although the present invention as described herein is described in the context of a standalone and/or integrated application module used with a general purpose computer implemented system which uses a speech recognition application to receive and recognize voice commands entered by a user, it should be appreciated that the invention disclosed herein may be used in any context suitable to the desired end purpose. For example, the present invention may be an integrated software routine or feature within a target software application, such as Microsoft® Word having a speech recognition module that practices the method of positioning a software User Interface (UI) window on a display screen and/or the present invention may be a routine or feature within the operating system of the general purpose computer. As an object-oriented application, the application module may expose a standard interface that client programs may access to communicate with the application module. The application module may also permit a number of different client programs, such as a word processing program, a desktop publishing program, an application program, and so forth, to use the application module locally and/or over network, such as a WAN, a LAN and/or an internet based vehicle. For example, the application module may be accessed and used with any application and/or control having a text field, such as an email application or Microsoft® Word, locally or via an internet access point. However, before describing aspects of the present invention, one embodiment of a suitable computing environment that can incorporate and benefit from this invention is described below.

Figure 1:
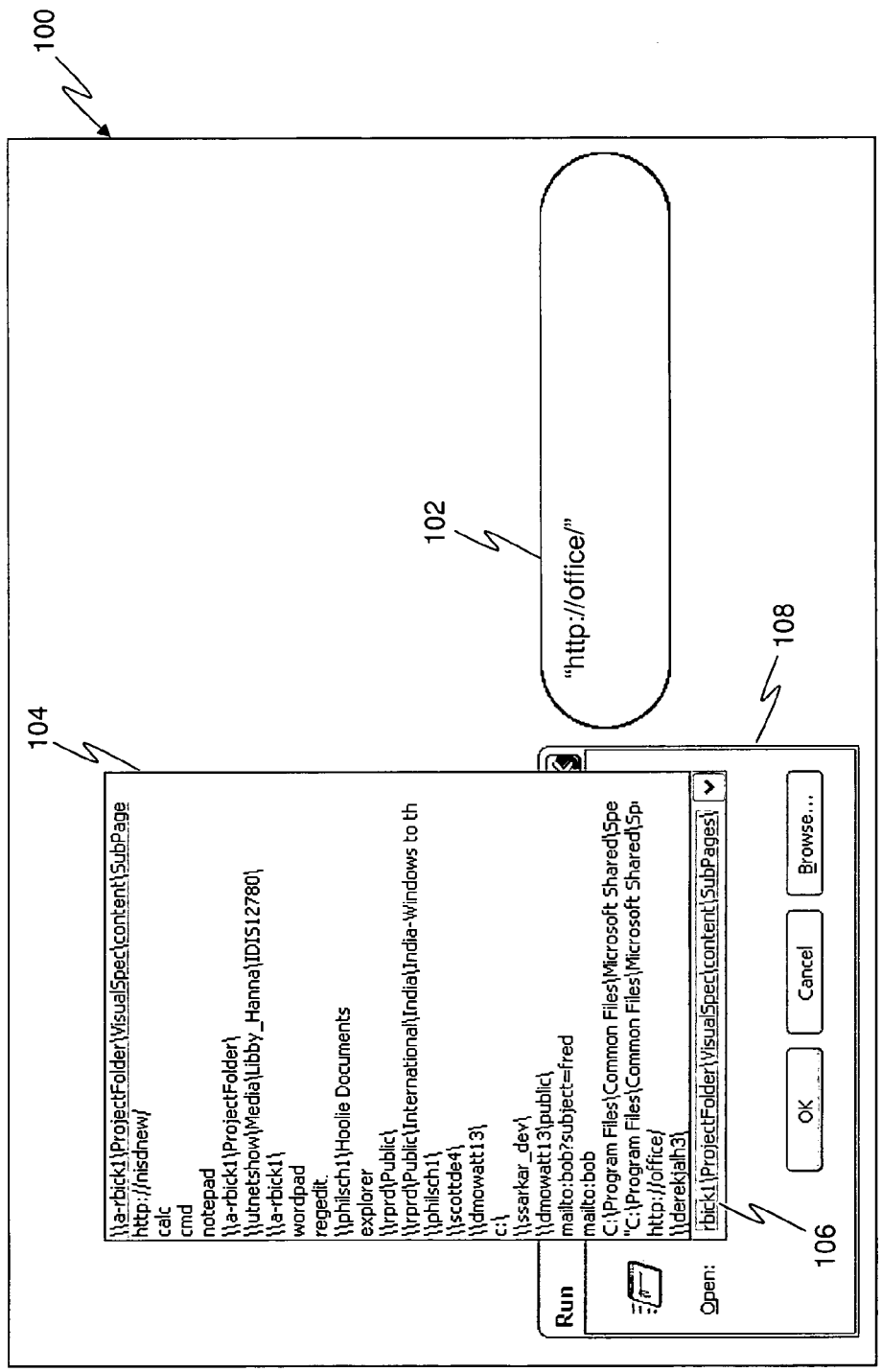
FIG. 1 is a User Interface (UI) dialog window in accordance with the prior art.
Figure 2:
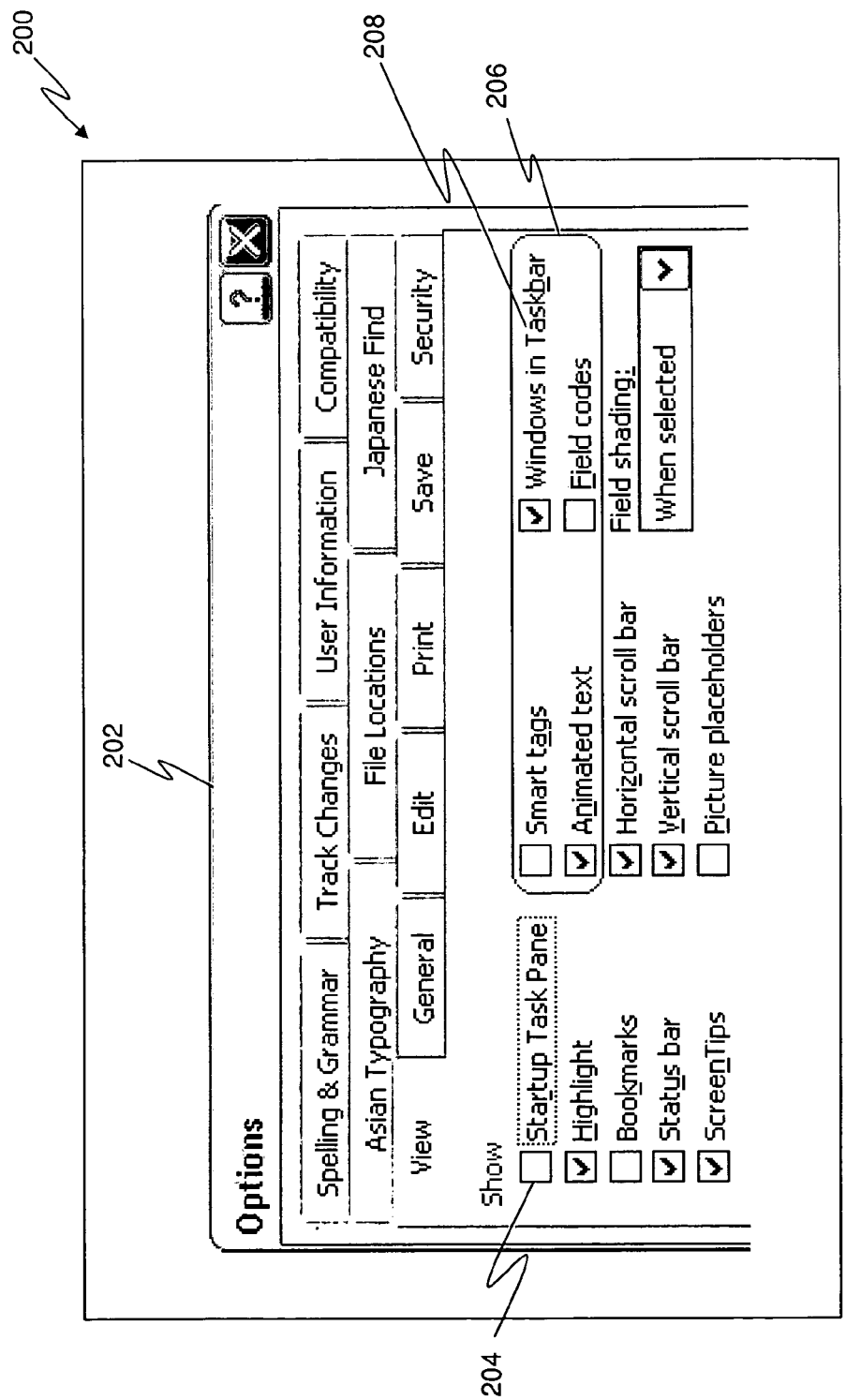
FIG. 2 is a User interface (UI) dialog window in accordance with the prior art.
Figure 3:
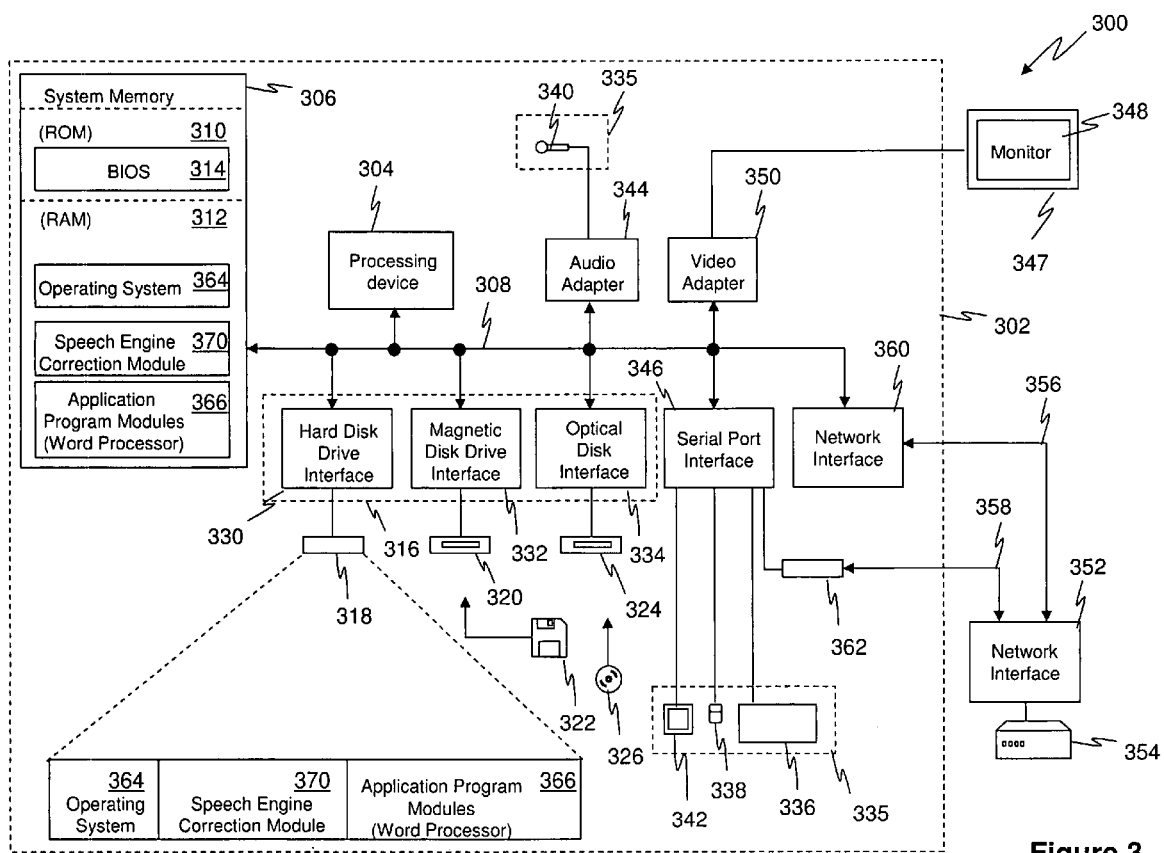
FIG. 3 is a schematic block diagram illustrating a system for implementing a method for positioning a User Interface (UI) window on a display screen.

Referring to FIG. 3, a block diagram illustrating a system 300 for implementing a method for positioning a software User Interface (UI) window on a display screen is shown and includes a general computer system 302, including a processing device 304, a system memory 306, and a system bus 308, wherein the system bus 308 couples the system memory 306 to the processing device 304. The system memory 306 may include read only memory (ROM) 310 and random access memory (RAM) 312. A basic input/output system 314 (BIOS), containing basic routines that help to transfer information between elements within the general computer system 302, such as during start-up, is stored in ROM 310. The general computer system 302 further includes a storage device 316, such as a hard disk drive 318, a magnetic disk drive 320, e.g., to read from or write to a removable magnetic disk 322, and an optical disk drive 324, e.g., for reading a CD-ROM disk 326 or to read from or write to other optical media. The storage device 316 may be connected to the system bus 308 by a storage device interface, such as a hard disk drive interface 330, a magnetic disk drive interface 332 and an optical drive interface 334. The drives and their associated computer-readable media provide nonvolatile storage for the general computer system 302. Although the description of computer-readable media above refers to a hard disk, a removable magnetic disk and a CD-ROM disk, it should be appreciated that other types of media that are readable by a computer system and that are suitable to the desired end purpose may be used, such as magnetic cassettes, flash memory cards, digital video disks, Bernoulli cartridges, and the like.

A user may enter commands and information into the general computer system 302 through a conventional input device 335, including a keyboard 336, a pointing device, such as a mouse 338 and a microphone 340, wherein the microphone 340 may be used to enter audio input, such as speech, into the general computer system 302. Additionally, a user may enter graphical information, such as drawings or hand writing, into the general computer system 302 by drawing the graphical information on a writing tablet 342 using a stylus. The general computer system 302 may also include additional input devices suitable to the desired end purpose, such as a joystick, game pad, satellite dish, scanner, or the like. The microphone 340 may be connected to the processing device 304 through an audio adapter 344 that is coupled to the system bus 308. Moreover, the other input devices are often connected to the processing device 304 through a serial port interface 346 that is coupled to the system bus 308, but may also be connected by other interfaces, such as a game port or a universal serial bus (USB).

A display device 347, such as a monitor or other type of display device 347, having a display screen 348, is also connected to the system bus 308 via an interface, such as a video adapter 350. In addition to the display screen 348, the general computer system 302 may also typically include other peripheral output devices, such as speakers and/or printers. The general computer system 302 may operate in a networked environment using logical connections to one or more remote computer systems 352. The remote computer system 352 may be a server, a router, a peer device or other common network node, and may include any or all of the elements described relative to the general computer system 302, although only a remote memory storage device 354 has been illustrated in FIG. 3. The logical connections as shown in FIG. 3 include a local area network (LAN) 356 and a wide area network (WAN) 358. Such networking environments are commonplace in offices, enterprise-wide computer networks, intranets and the Internet.

When used in a LAN networking environment, the general computer system 302 is connected to the LAN 356 through a network interface 360. When used in a WAN networking environment, the general computer system 302 typically includes a modem 362 or other means for establishing communications over a WAN 358, such as the Internet. The modem 362, which may be internal or external, may be connected to the system bus 308 via the serial port interface 346. In a networked environment, program modules depicted relative to the general computer system 302, or portions thereof, may be stored in the remote memory storage device 354. It should be appreciated that the network connections shown are exemplary and other means of establishing a communications link between the computer systems may be used. It should also be appreciated that the application module could equivalently be implemented on host or server computer systems other than general computer systems, and could equivalently be transmitted to the host computer system by means other than a CD-ROM, for example, by way of the network connection interface 360.

Figure 4:
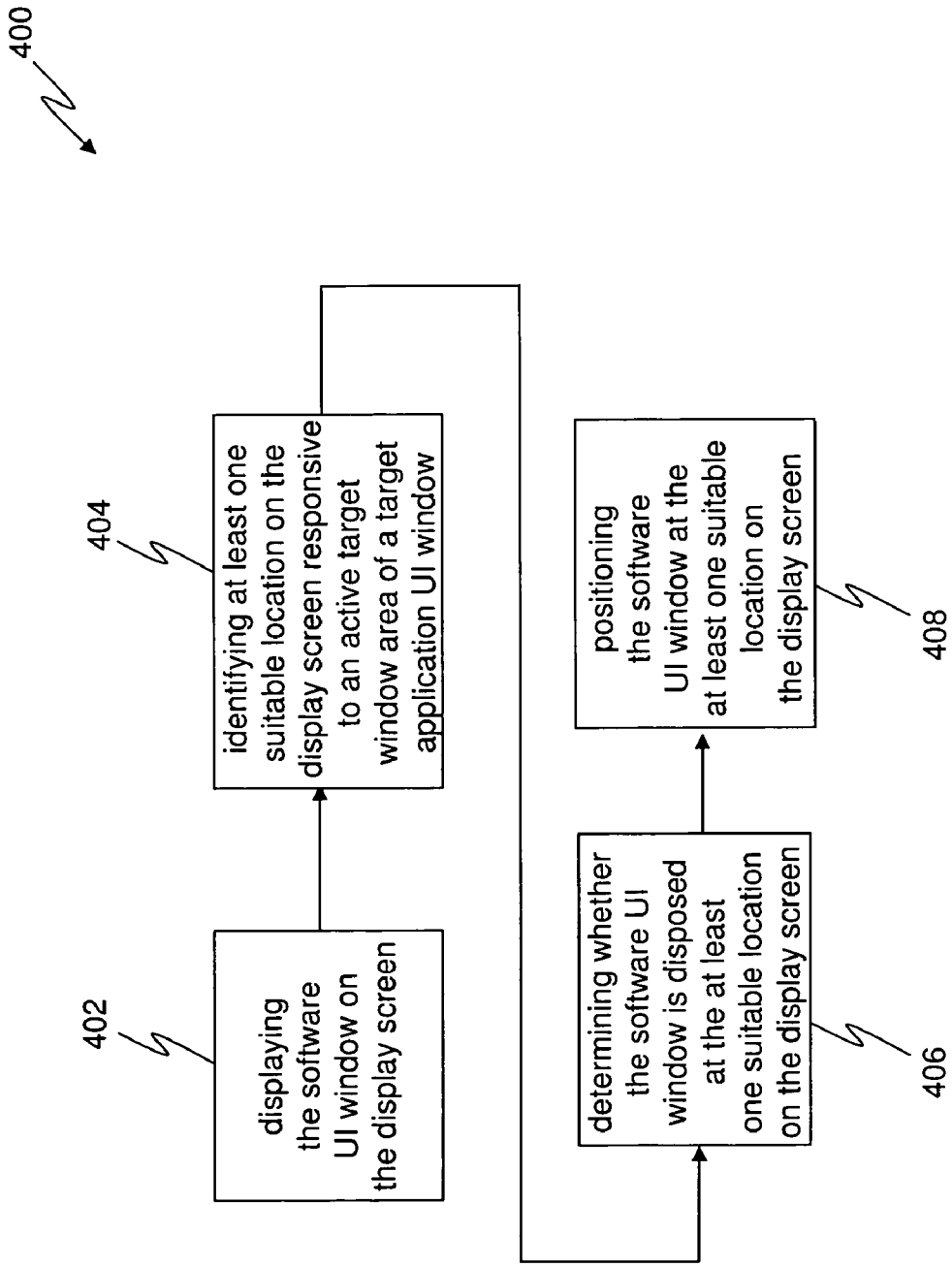
FIG. 4 is a block diagram illustrating a method for positioning a User Interface (UI) window on a display screen.

Furthermore, a number of program modules may be stored in the drives and RAM 312 of the general computer system 302. Program modules control how the general computer system 302 functions and interacts with the user, with I/O devices or with other computers. Program modules include routines, operating systems 364, target application program modules 366, data structures, browsers, and other software or firmware components. The method of the present invention may be included in an application module and the application module may conveniently be implemented in one or more program modules, such as a speech engine correction module 370 based upon the methods described herein. The target application program modules 366 may comprise a variety of applications used in conjunction with the present invention, some of which are shown in FIG. 4. The purposes of and interactions between some of these program modules are discussed more fully in the text describing FIG. 4. These include any application and/or control having a text field, e.g. an email application, a word processor program (such as Microsoft® Word, produced by Microsoft Corporation of Redmond, Wash.), a handwriting recognition program module, the speech engine correction module 370, and an input method editor (IME).

It should be appreciated that no particular programming language is described for carrying out the various procedures described in the detailed description because it is considered that the operations, steps, and procedures described and illustrated in the accompanying drawings are sufficiently disclosed to permit one of ordinary skill in the art to practice an exemplary embodiment of the present invention. Moreover, there are many computers and operating systems which may be used in practicing an exemplary embodiment, and therefore no detailed computer program could be provided which would be applicable to all of these many different systems. Each user of a particular computer will be aware of the language and tools which are most useful for that user's needs and purposes.

Referring to FIG. 4, a block diagram illustrating a method 400 for positioning a Software User Interface (UI) window on a display screen 348 is shown as being implemented with a general computer system 302 having a processing device 304 communicated with a storage device 316 and a display device 347, wherein the display device 347 includes the display screen 348. The general computer system 302 also includes an input device 335, wherein the input device 335 is in communication with the processing device 304. As discussed above, the input device 335 may be any input device suitable to the desired end purpose, such as a microphone 340. Furthermore, the storage device 316 may include a Speech Recognition Software Application to allow the processing device 304 to access the Speech Recognition Software Application. Moreover, at least one target software application may also be stored on the storage device 316 to allow a user to implement the target software application via an instruction to the processing device 304 entered using the input device 335.

Figure 5:
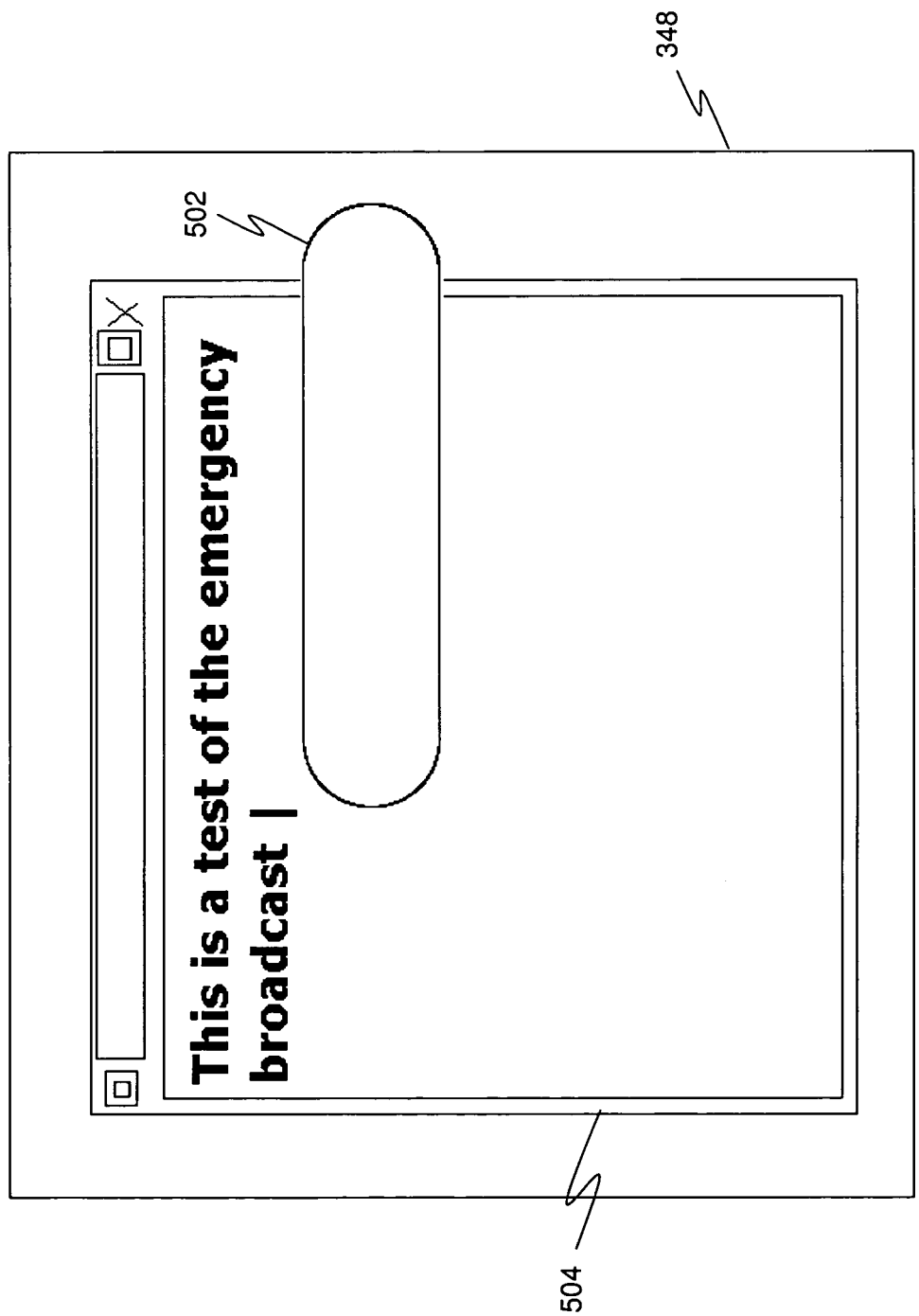
FIG. 5 is a front view of a software UI window and a target application UI window, in accordance with the method of FIG. 4.

Once implemented, a software UI window is displayed on the display screen 348, as shown in operational block 402. This may be accomplished by activating the speech recognition software application via the processing device 304 in response to a user instruction via the input device 335 and/or the processing device 304 may activate the speech recognition software application in response to an instruction recognized by the Operating System 364 upon startup, such as a "boot up" instruction. Referring to FIG. 5, the speech recognition software application displays a software UI window 502 on the display screen 348 immediately upon activation or the speech recognition software application may display a software UI window 502 on the display screen 348 only during active use of the speech recognition software application. The target software application may also be implemented via the processing device 304 acting on an instruction from the input device 335, wherein the target software application displays a target application UI window 504 on the display screen 348. Processing device 304 identifies at least one suitable location on the display screen 348, operational block 404, and determines whether the software UI window 502 is disposed in the suitable location on the display screen 348, as shown in operational block 406. If the software UI window 502 is disposed at a suitable location on the display screen 348, then the software UI window 502 is allowed to remain in its current location. However, if the software UI window 502 is not disposed at a suitable location on the display screen 348, then the software UI window 502 is positioned at a suitable location on the display screen 348, as shown in operational block 408.

Figure 6:
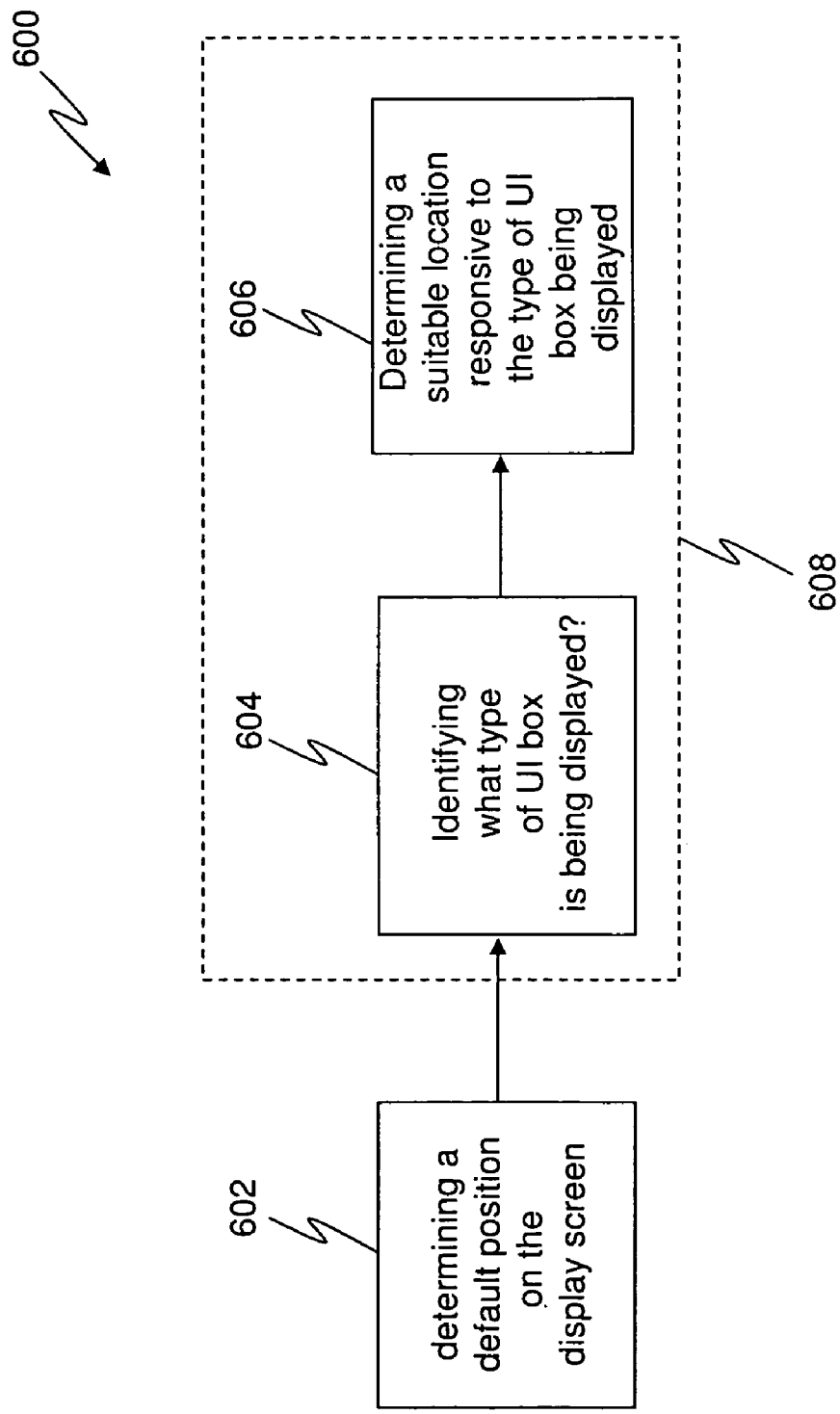
FIG. 6 is a block diagram illustrating one embodiment for identifying whether a software UI window is disposed in a suitable location on a display screen, in accordance with the method of FIG. 4.
Figure 12:
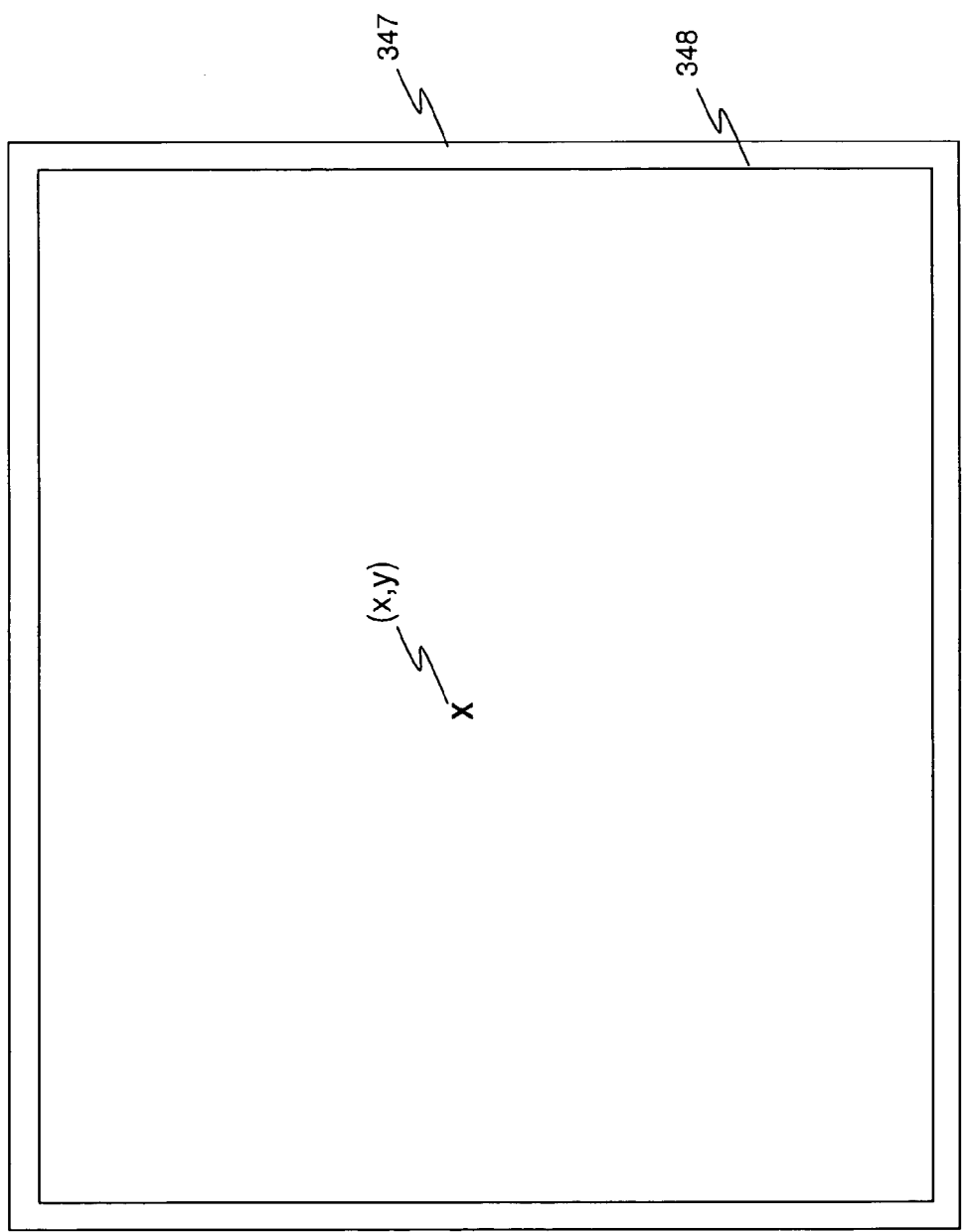
FIG. 12 is a front view of a software UI window, in accordance with the embodiment of FIG. 6.

It should be appreciated that the processing device 304 identifies whether the software UI window 502 is disposed in a suitable location on the display screen 348 as follows. Referring to FIG. 6, a block diagram 600 illustrating one embodiment for identifying whether a software UI window 502 is disposed in a suitable location on the display screen 348 is shown and includes determining a default position (x,y) on the display screen 348, such as the middle of the display screen 348, as shown in operational block 602. This can be seen by referring to FIG. 12 which shows a display screen 348 and a default position (x,y) on the display screen 348, wherein the default position selected is the middle of the display screen 348.

Figure 7:
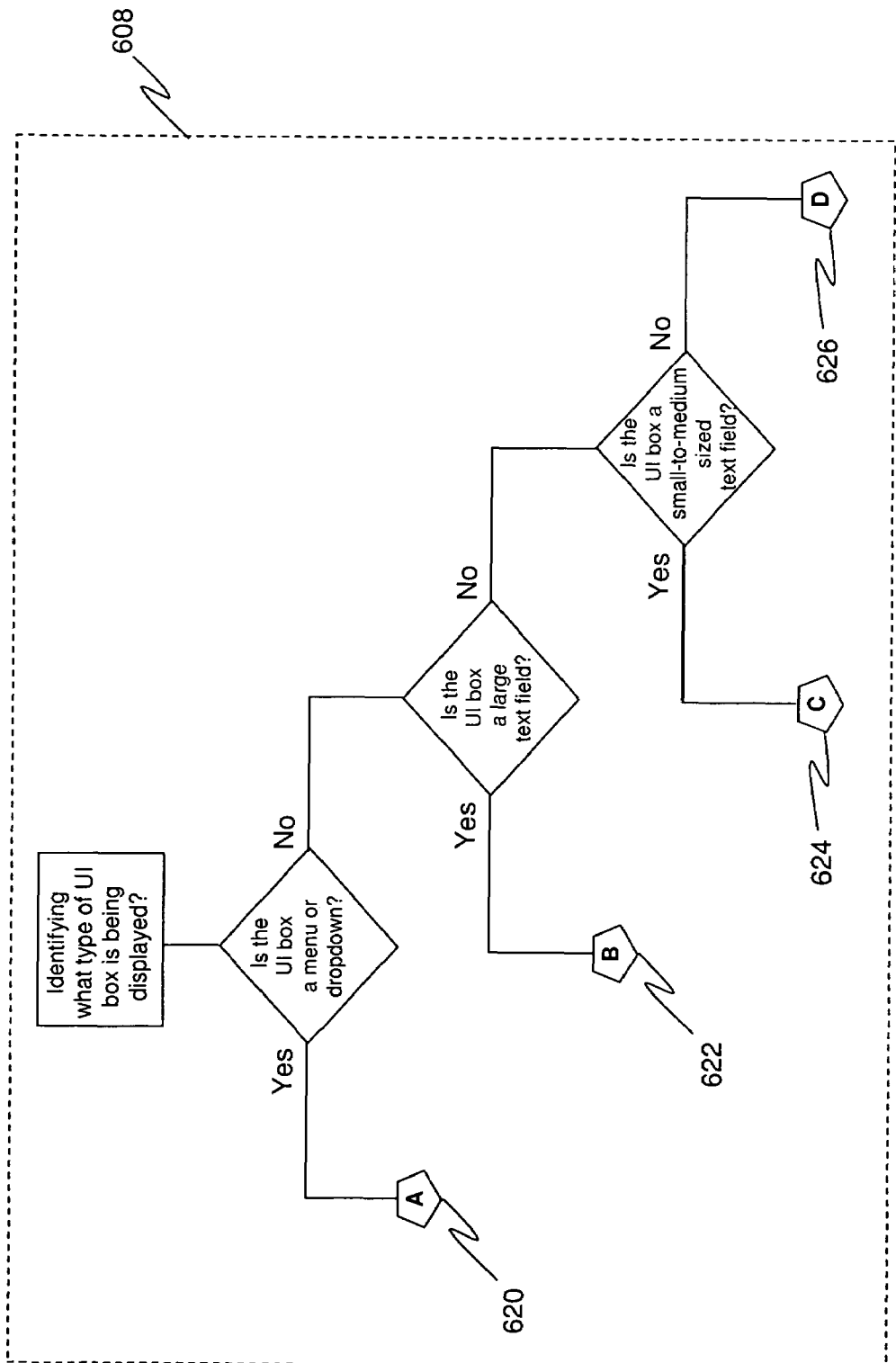
FIG. 7 is a higher level block diagram illustrating one embodiment for identifying a control type in a target application UI window, in accordance with the embodiment of FIG. 6.

If the software UI window 502 and a target application UI window 504 having an active target window area 506 is being displayed on the display screen simultaneously, a determination is made as to the characteristics of the control being displayed, as shown in operational block 604, such as the size of the control being displayed and/or the size of the UI window in which the control is located. Referring to FIG. 7, these control types may include, but are not limited to, a dropdown menu, as shown in operational block 620, a file menu, as shown in operational block 622, a text field, as shown in operational block 624, and an unspecified non-text-field control type, as shown in operational block 626. The UI Window and Control size classifications may include, but are not limited to, windows/controls which are less than 75% of the width of the display screen 348, windows/controls which are less than 60% of the width of the display screen 348 and windows/controls which are greater than 75% of the width of the display screen 348. At this point, a suitable location on the display screen 348 is determined responsive to the type of display screen being displayed, as shown in operational block 606 and as described in more detail hereinbelow. It should be appreciated that for discussion purposes, operational block 604 and operational block 606 are shown as entity 608 and are described further herein below.

Figure 8:
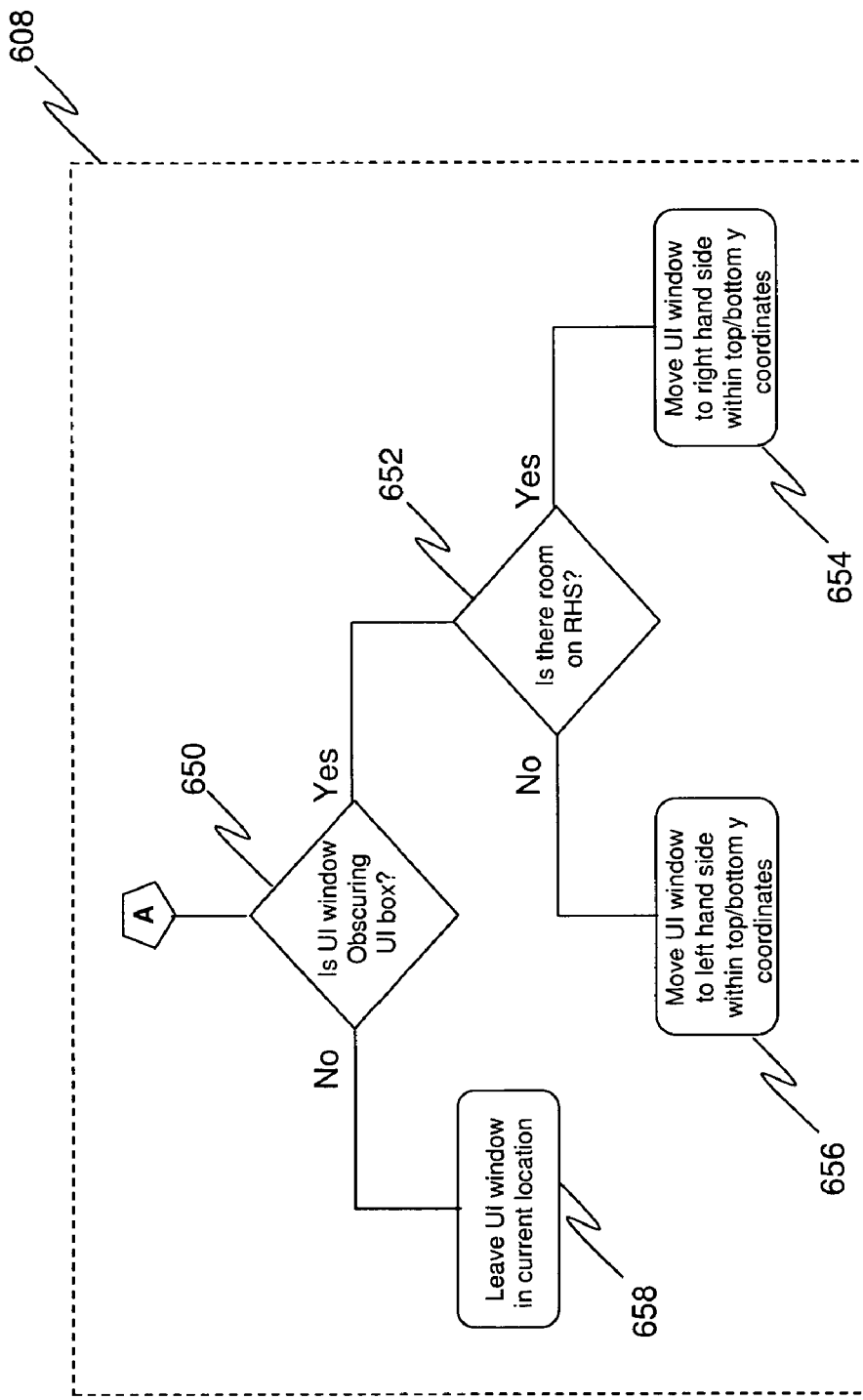
FIG. 8 is a lower level block diagram illustrating one embodiment for positioning a software UI window for a drop-down menu, in accordance with the embodiment of FIG. 6.
Figure 13:
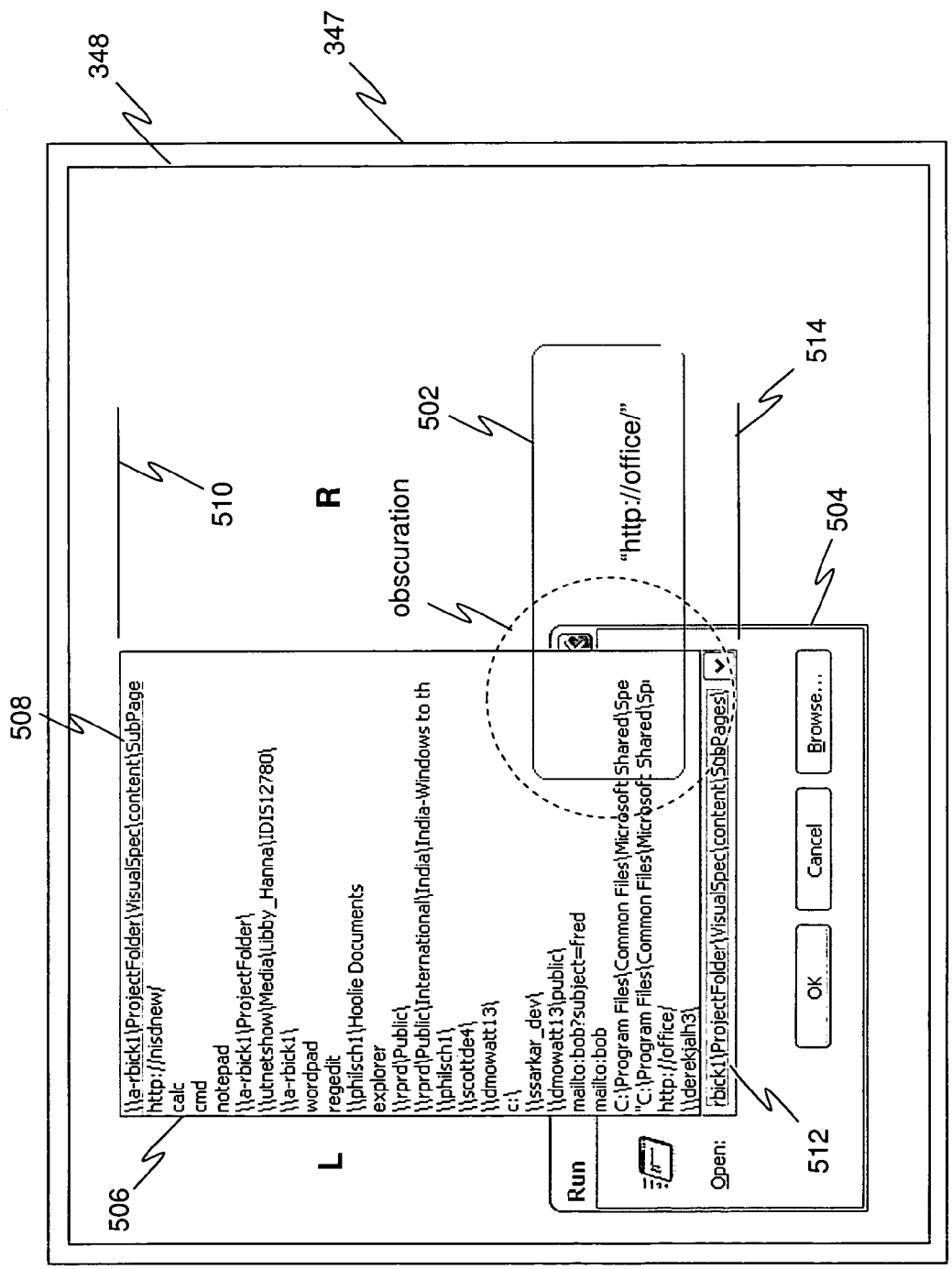
FIG. 13 is a front view of a software UI window and a target application UI window, in accordance with the embodiment of FIG. 6.

Referring to Referring to FIG. 8 and FIG. 13, if the target application UI window 504 having an active target window area 506 is a dropdown and/or a menu, the dimensions of the software UI window 502 and the active target window area 506 are determined along with their respective locations on the display screen 348. These dimensions and locations of the software UI window 502 and the active target window area 506 are processed to determine if they overlap, wherein if these dimensions do overlap, then a determination is made that the software UI window 502 is obscuring at least a portion of the active target window area 506, as shown in operational block 650. This is shown as the circled section in FIG. 13. It is then determined whether the software UI window 502 may be positioned adjacent to and right R of the active target window area 506 such that the software UI window 502 fits below a plane 508 formed by and extending from the top edge 510 of the active target window area 506 and above a plane 512 formed by and extending from the bottom edge 514 of the active target window area 506 while still being completely visible on the display screen 348, as shown in operational block 652.

If the software UI window 502 does fit adjacent to and right R of the active target window area 506 then this location is identified as a suitable location and the software UI window 502 is moved to this position, as shown in operational block 654. However, if it is determined that the software UI window 502 does not fit adjacent to and right R of the active target window area 506, then it is determined whether the software UI window 502 may be positioned adjacent to and left L of the active target window area 506 such that the software UI window 502 fits below the plane 508 formed by and extending from the top edge 510 of the active target window area 506 and above the plane 510 formed by and extending from the bottom edge 512 of the active target window area 506 while still being completely visible on the display screen 348. If the software UI window 502 does fit adjacent to and left L of the active target window area 506 then this location is identified as a suitable location and the software UI window 502 is moved to this position, as shown in operational block 656. If the software UI window 502 is not obscuring at least a portion of the active target window area 506, then the software UI window 502 is left in the same location, as shown in operational block 658.

Figure 9:
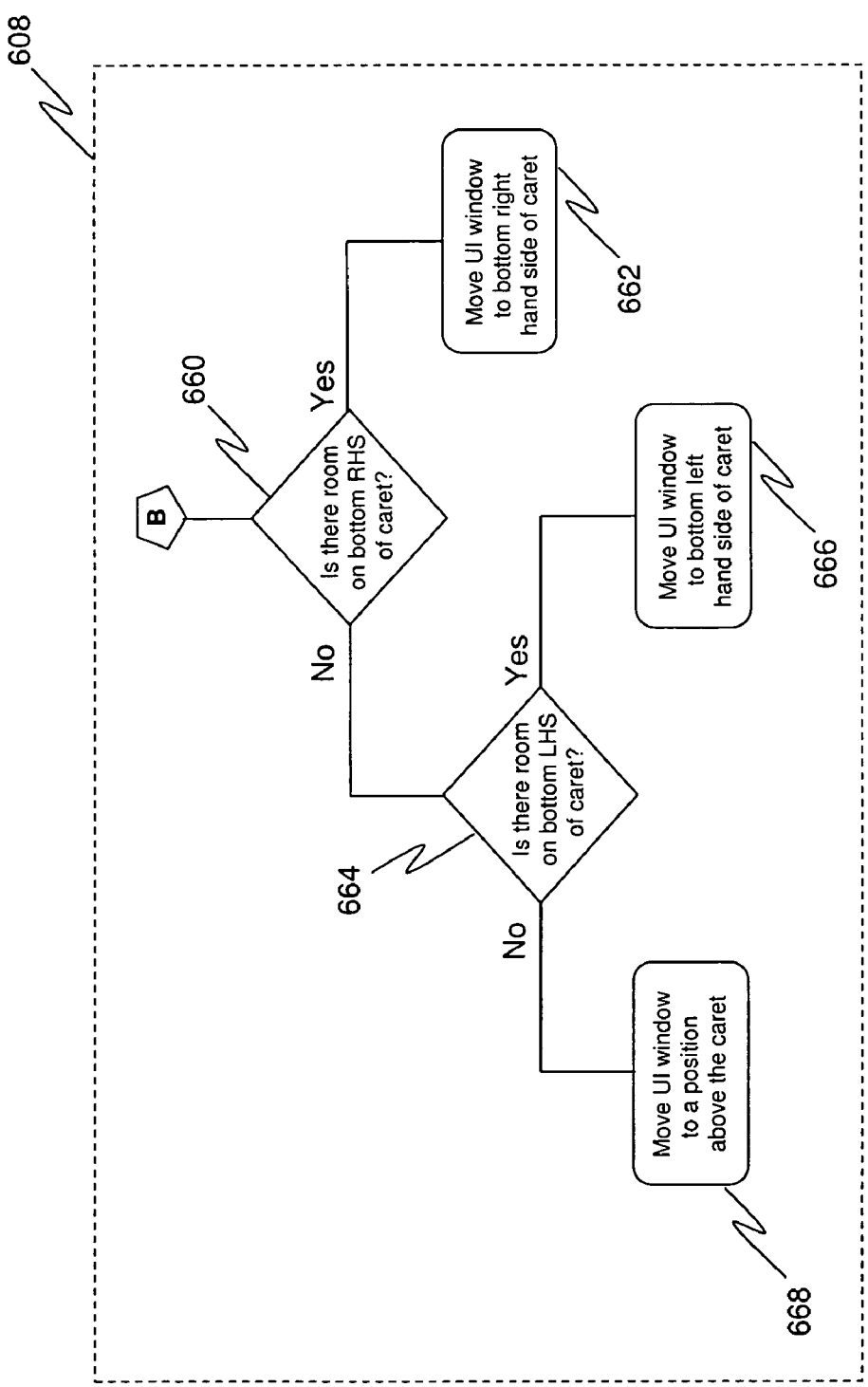
FIG. 9 is a lower level block diagram illustrating one embodiment for positioning a software UI window for a large dialog box, in accordance with the embodiment of FIG. 6.
Figure 14:
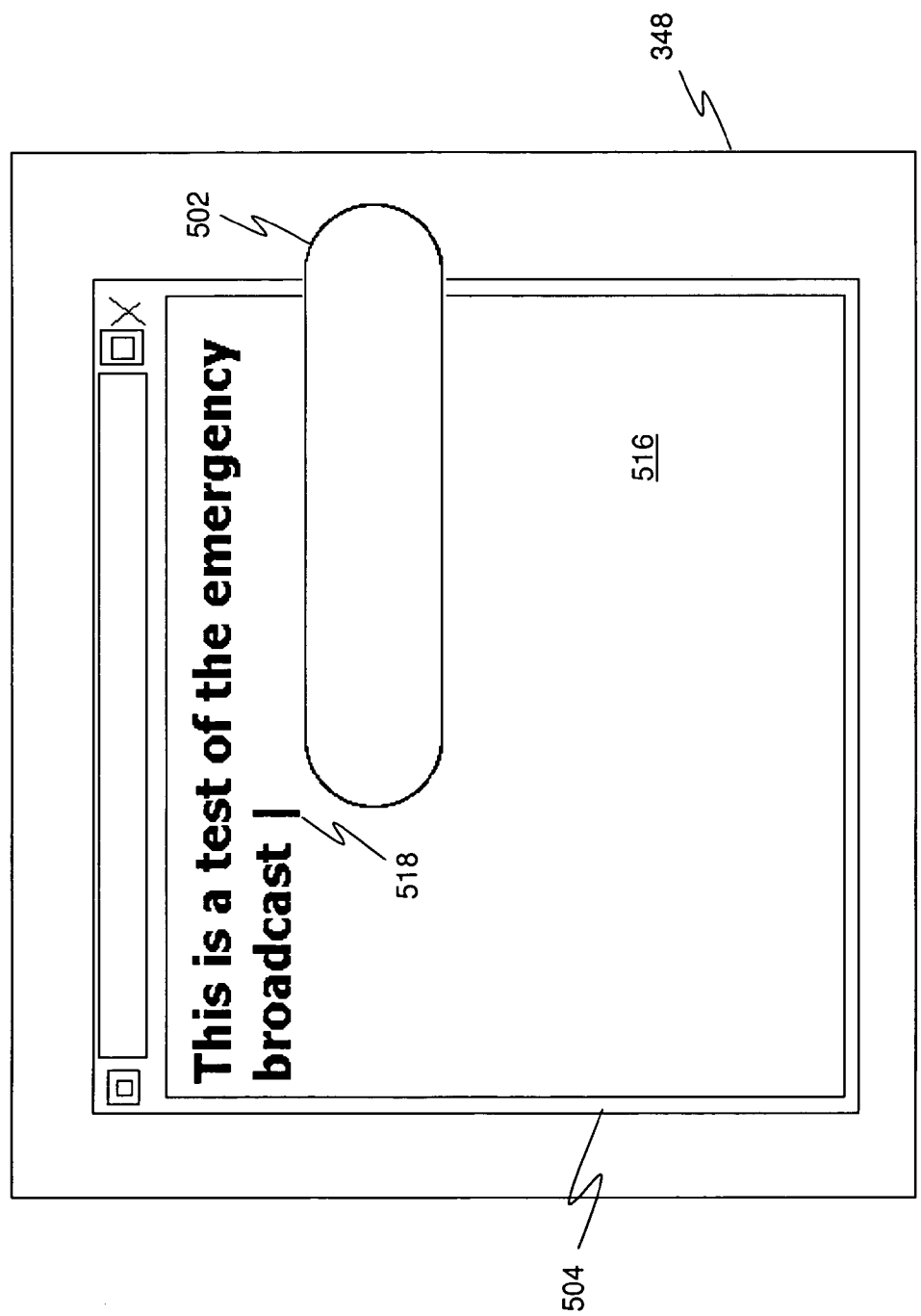
FIG. 14 is a front view of a software UI window and a target application UI window, in accordance the embodiment of FIG. 6.
Figure 15:
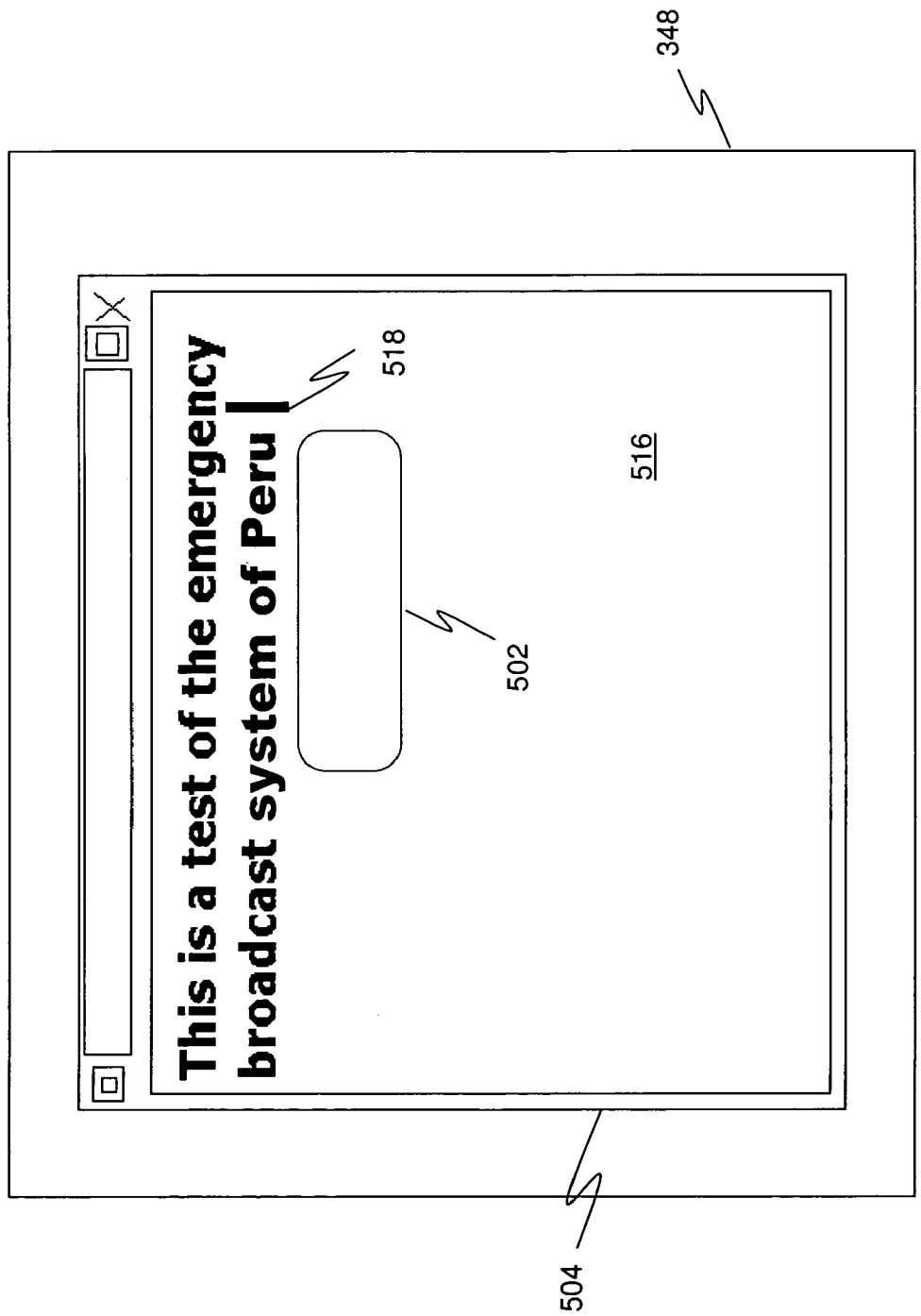
FIG. 15 is a front view of a software UI window and a target application UI window, in accordance with the embodiment of FIG. 6.

Referring to FIG. 9 and FIG. 14, if the target application UI window 504 is a large text field window 516 (i.e. a text field window having at least one of a width greater than 60% of the width of the display screen 348, a width greater than 1000 pixels and a height greater than 1.5 times the system font), then a determination is made as to whether the software UI window 502 can be place to the bottom right of a caret 518 displayed in the large text field window 516 while still being completely visible on the display screen 348, as shown in operational block 660. If the software UI window 502 can be placed to the bottom right hand side of caret 518, then the software UI window 502 is positioned at that location, as shown in operational block 662. However, referring to FIG. 15 if the software UI window 502 cannot be placed to the bottom right of the caret 518 and still be completely visible on the display screen 348, then a determination is made as to whether the software UI window 502 can be place to the bottom left of the caret 518 displayed in the large text field window 516 while still being completely visible on the display screen 348, as shown in operational block 664. If the software UI window 502 can be placed to the bottom left hand side of caret 518, then the software UI window 502 is positioned at that location, as shown in operational block 666. However, if the software UI window 502 cannot be placed to the bottom left of the caret 518 and still be completely visible on the display screen 348, then the software UI window 502 is placed above the caret 518 displayed in the large text field window 516, as shown in operational block 668.

Figure 10:
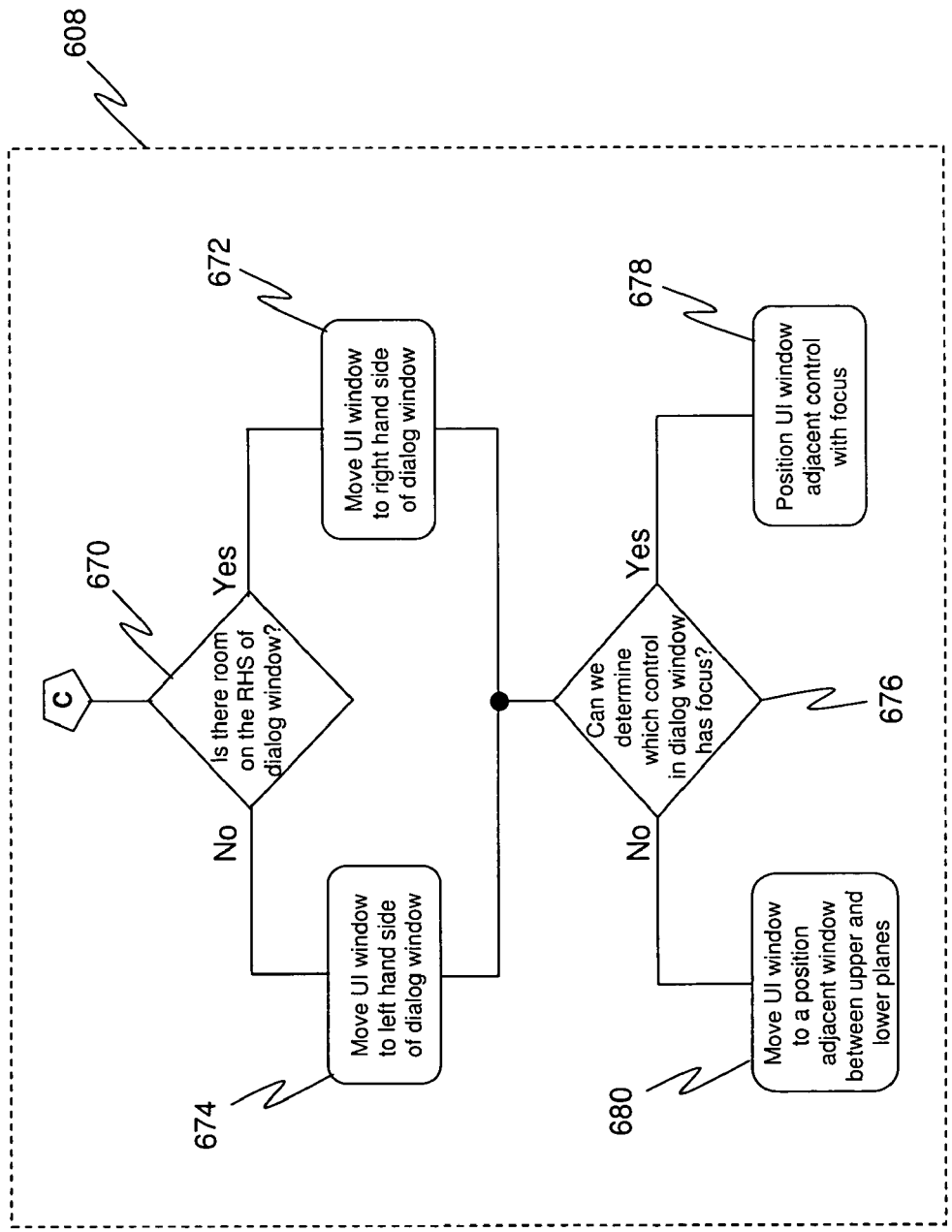
FIG. 10 is a lower level block diagram illustrating one embodiment for positioning a software UI window for a small-to-medium sized dialog box, in accordance with the embodiment of FIG. 6.
Figure 16:
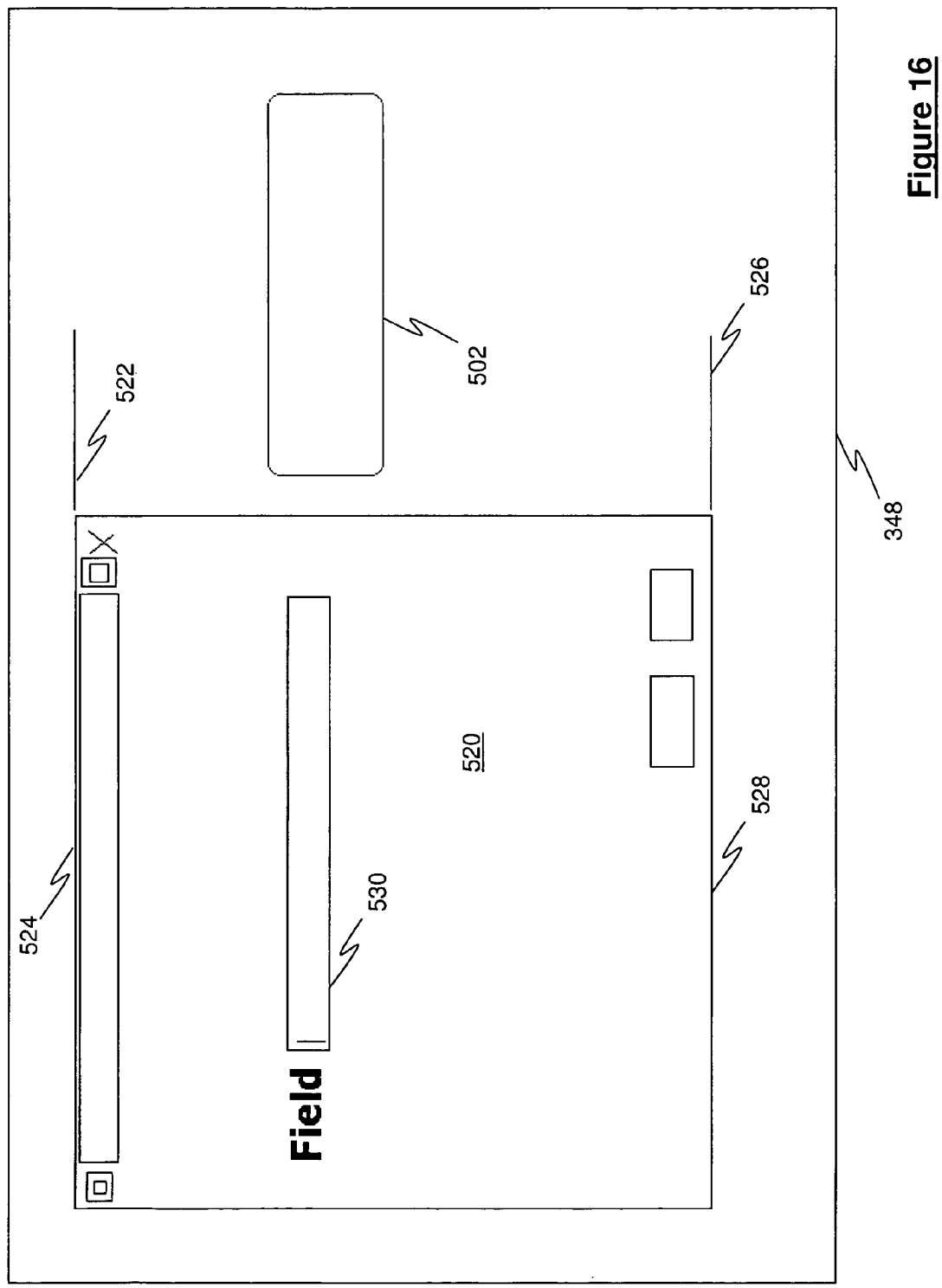
FIG. 16 is a front view of a software UI window and a target application UI window, in accordance with the embodiment of FIG. 6.
Figure 17:
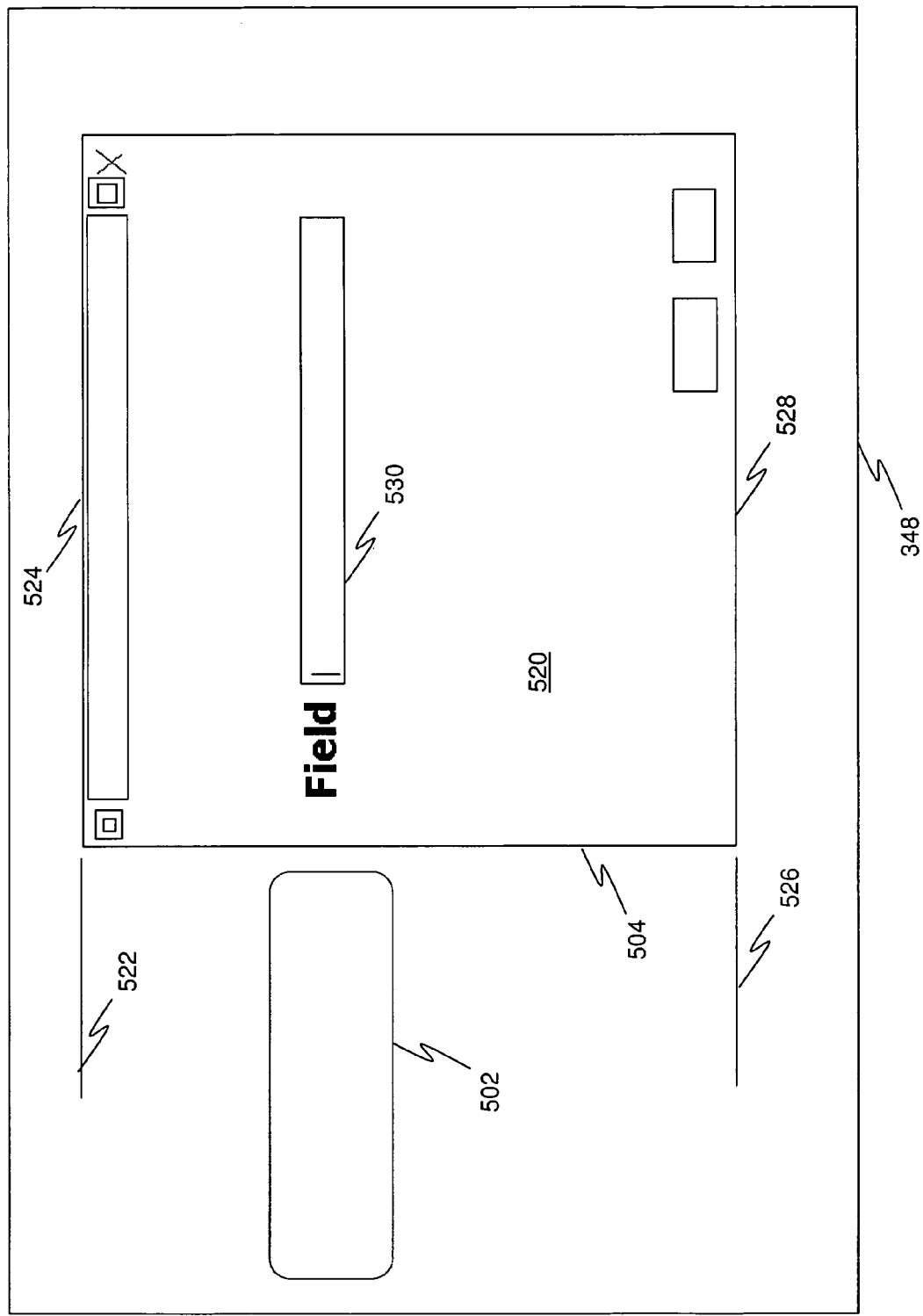
FIG. 17 is a front view of a software UI window and a target application UI window, in accordance with the embodiment of FIG. 6.

Referring to FIG. 10 and FIG. 16, if the target application UI window 504 is a small-to-medium sized dialog window 520, then a determination is made as to whether the software UI window 502 can be placed to the right of the dialog window 520 and still be completely visible on the display screen 348, as shown in operational block 670. If the software UI window 502 can be placed to the right of the dialog window 520 and still be completely visible on the display screen 348, then the software UI window 502 is placed to the right of the dialog window 520, as shown in operational block 672. Otherwise the software UI window 502 is placed to the left of the dialog window, as shown in FIG. 17 and operational block 674. A determination is made as to which control in the small-to-medium sized dialog window has focus, as shown in operational block 676, and the software UI window 502 is positioned to be adjacent the control with focus, as shown in operational block 678. However, if a determination is unable to be made as to which control has focus, then the software UI window is positioned adjacent the small-to-medium sized dialog window to be between a plane 522 formed by and extending from the top edge 524 of the dialog window 520 and a plane 526 formed by and extending from the bottom edge 528 of the dialog window 520, as shown in FIG. 16, FIG. 17 and operational block 680. If a determination can be made as to which control 530 in dialog window 520 has focus, then the software UI window 502 may be positioned to be vertically aligned with the control 530, to be on the same horizontal plane.

Figure 11:
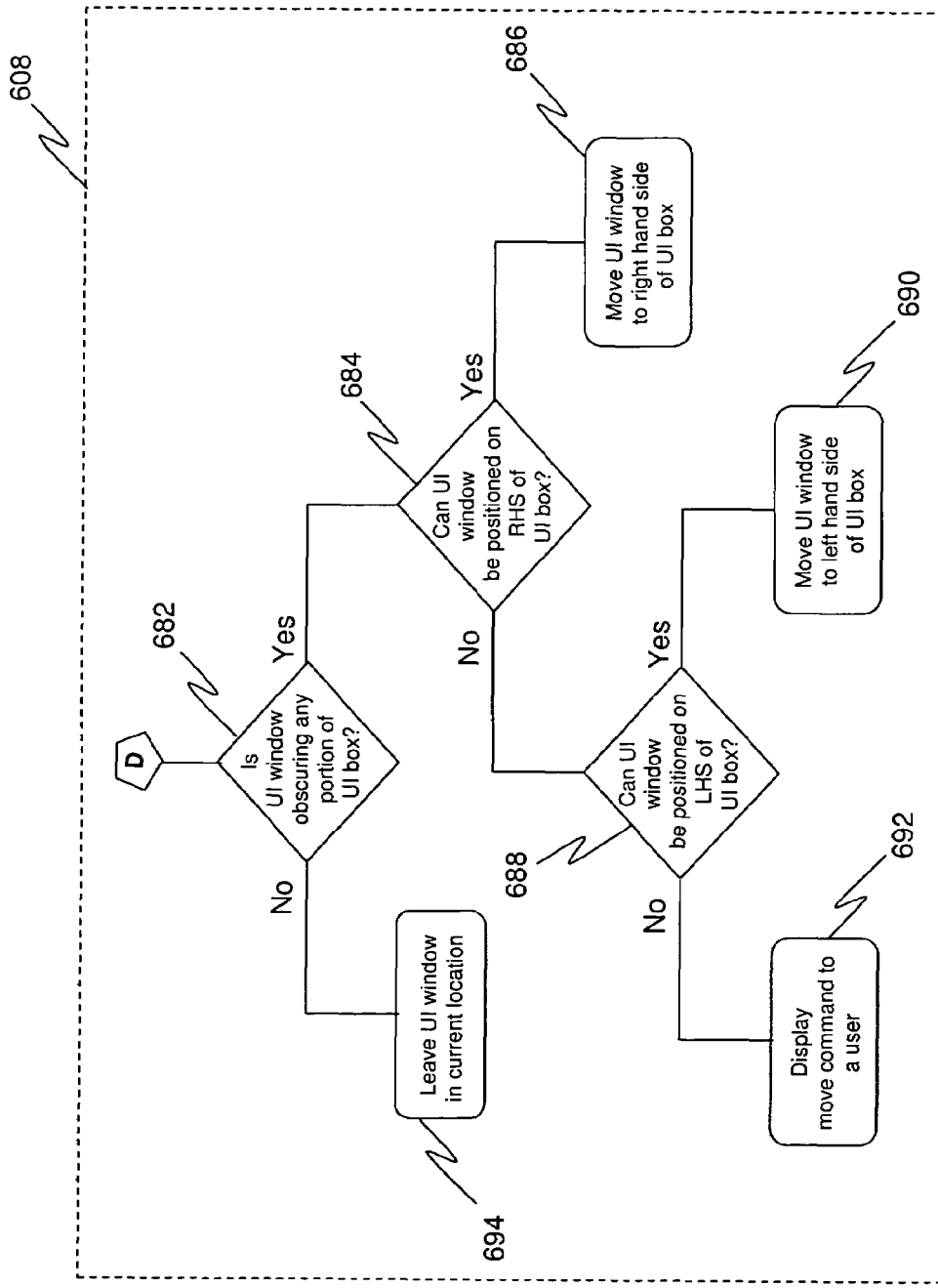
FIG. 11 is a lower level block diagram illustrating one embodiment for positioning a software UI window for an uncategorized dialog window, in accordance with the embodiment of FIG. 6.
Figure 18:
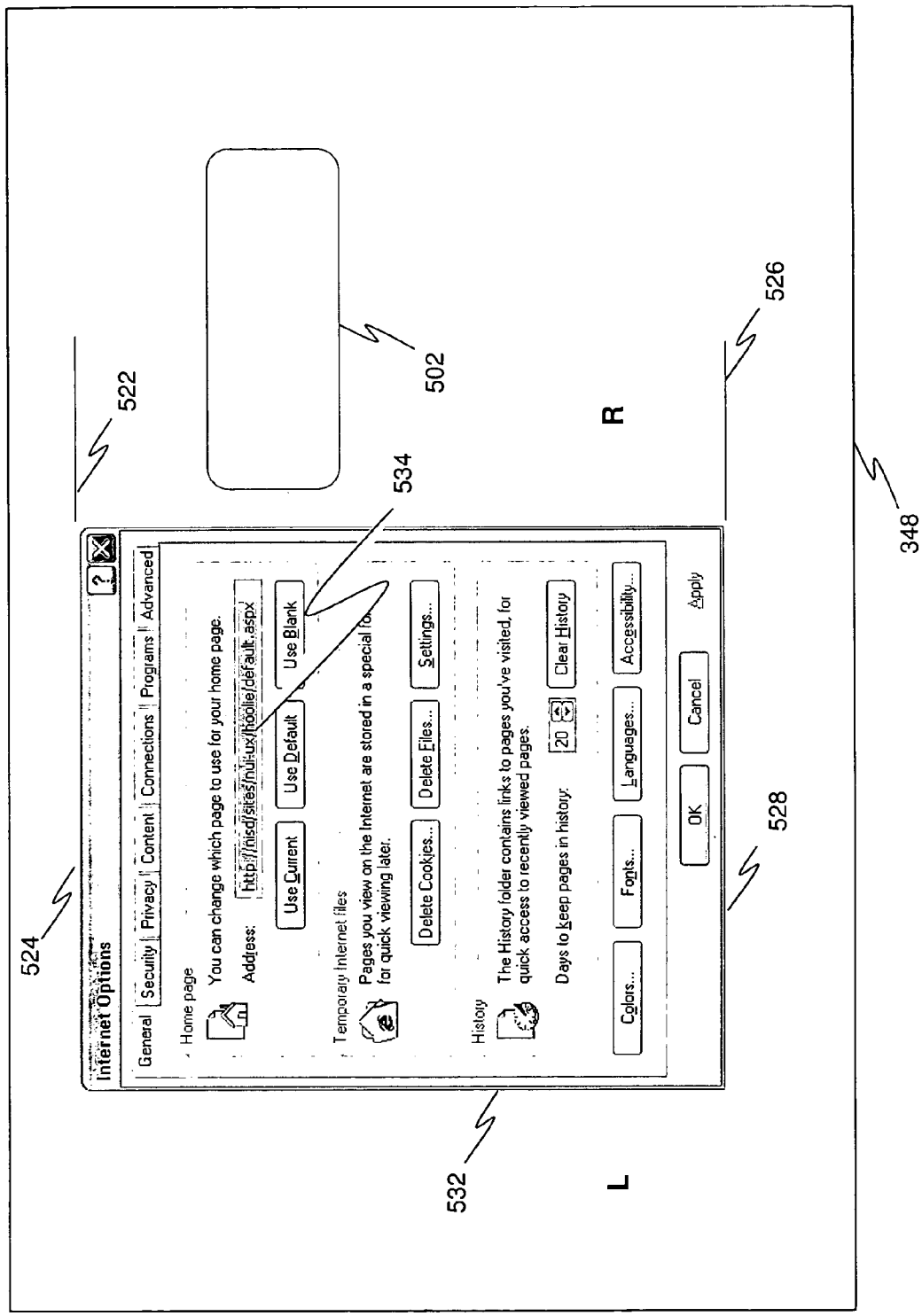
FIG. 18 is a front view of a software UI window and a target application UI window, in accordance with the embodiment of FIG. 6.

Referring to FIG. 11, it should be appreciated that if the target application UI window 532 having an active target window area 534 is neither a dropdown, a menu, a large text field window nor a small-to-medium sized dialog window, then a determination is made as to whether the software UI window 502 is obscuring any portion of the target application UI window 532, which may be a top level window or a control with focus, as shown in operational block 682. In this case, a determination is made as to whether the software UI window 502 can be placed to the right hand side R of the target application UI window 532 while still being completely visible on the display screen 348, as shown in operational block 684. If the software UI window 502 can be placed to the right hand side R of the target application UI window 532 and still be completely visible on the display screen 348, then the software UI window 502 is placed to the right hand side R of the target application UI window 532, as shown in FIG. 18 and operational block 686. It should be appreciated that the software UI window 502 should be disposed vertically such that the software UI window is horizontally aligned with the control 530 that has focus.

Figure 19:
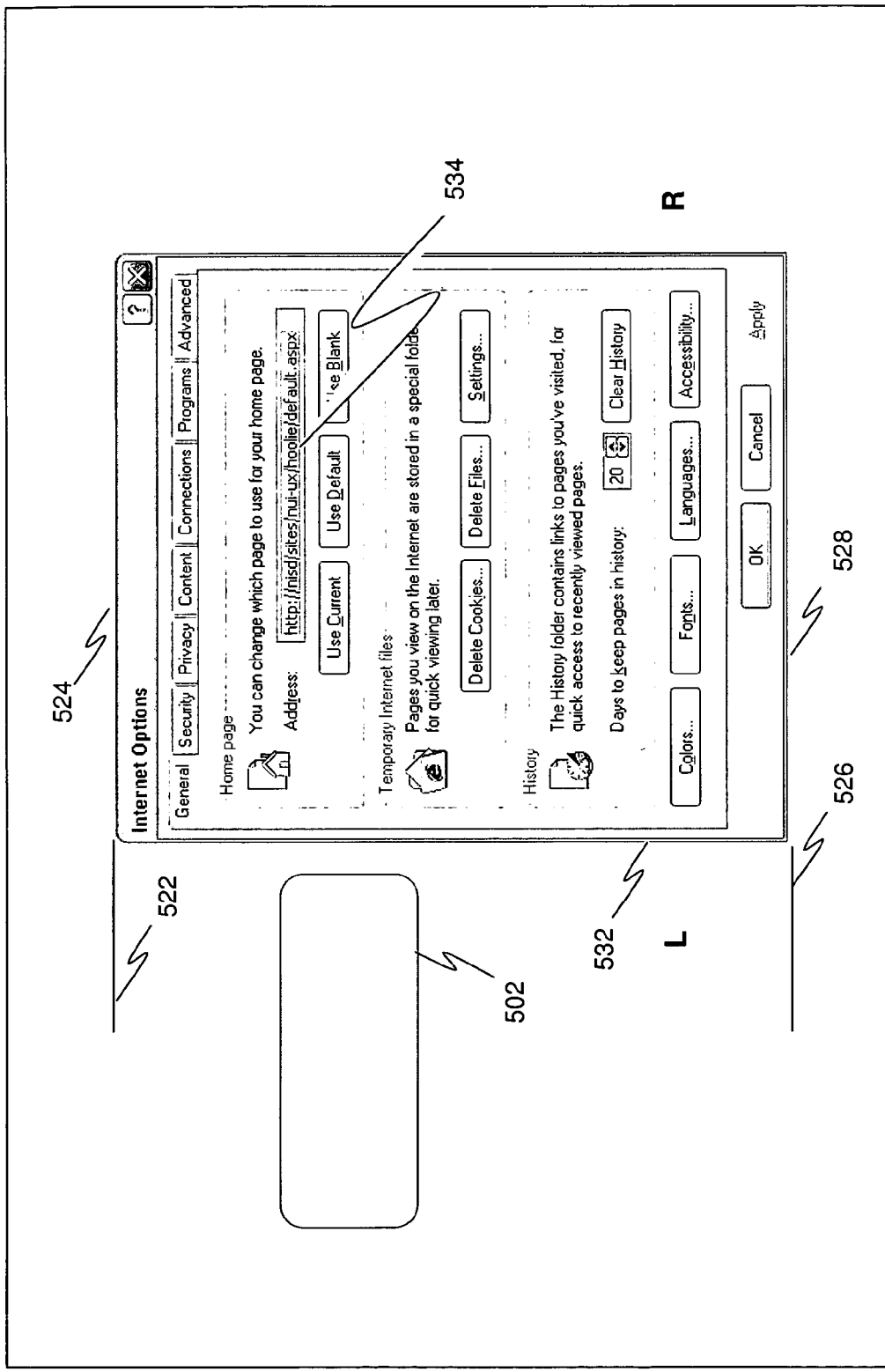
FIG. 19 is a front view of a software UI window and a target application UI window, in accordance with the embodiment of FIG. 6.

However, if the software UI window 502 cannot be placed to the right hand side R of the target application UI window 532 and still be completely visible on the display screen 348, then a determination is made as to whether the software UI window 502 can be placed to the left hand side L of the target application UI window 532 while still being completely visible on the display screen 348, as shown in operational block 688. If the software UI window 502 can be placed to the left hand side L of the target application UI window 532 and still be completely visible on the display screen 348, then the software UI window 502 is placed to the left hand side L of the target application UI window 532, as shown in FIG. 19 and operational block 690. It should be appreciated that the software UI window 502 should be disposed vertically such that the software UI window is horizontally aligned with the control 530 that has focus.

Figure 20:
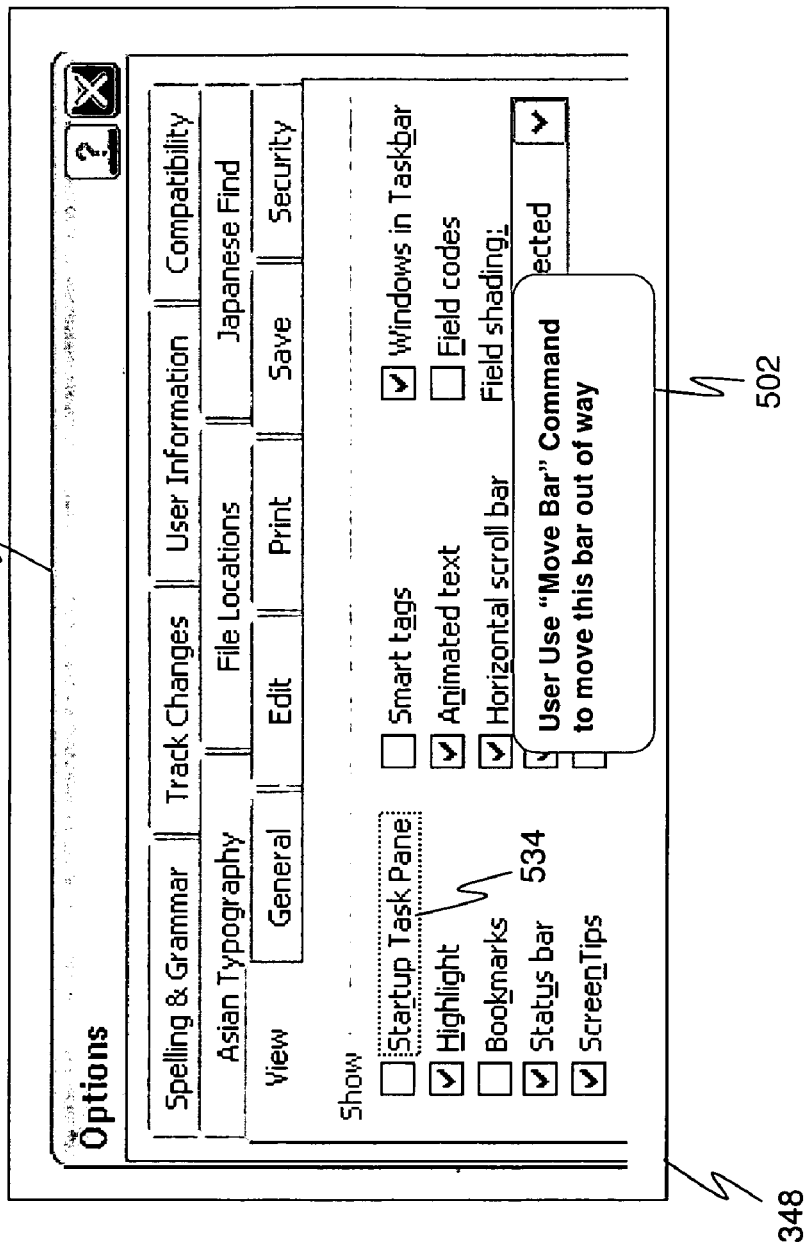
FIG. 20 is a front view of a software UI window and a target application UI window, in accordance with the embodiment of FIG. 6.

However, if the software UI window 502 is still obscuring the target application UI window 504, then feedback is communicated to the user to inform the user of a command (e.g. Move bar) which will allow the user to easily move the software UI window 502 out of the way, as shown in FIG. 20 and operational block 692. If the software UI window 502 is not obstructing a target application UI window 504, then the software UI window 502 should remain in its present location, as shown in operational block 694.

In accordance with an exemplary embodiment, the processing of FIG. 4 and FIG. 6 may be implemented, wholly or partially, by a controller operating in response to a machine-readable computer program. In order to perform the prescribed functions and desired processing, as well as the computations therefore (e.g. execution control algorithm(s), the control processes prescribed herein, and the like), the controller may include, but not be limited to, a processor(s), computer(s), memory, storage, register(s), timing, interrupt(s), communication interface(s), and input/output signal interface(s), as well as combination comprising at least one of the foregoing.

Moreover, the invention may be embodied in the form of a computer or controller implemented processes. The invention may also be embodied in the form of computer program code containing instructions embodied in tangible media, such as floppy diskettes, CD-ROMs, hard drives, and/or any other computer-readable medium, wherein when the computer program code is loaded into and executed by a computer or controller, the computer or controller becomes an apparatus for practicing the invention. The invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein when the computer program code is loaded into and executed by a computer or a controller, the computer or controller becomes an apparatus for practicing the invention. When implemented on a general-purpose microprocessor the computer program code segments may configure the microprocessor to create specific logic circuits.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method, implemented on a system comprising a processing device, for positioning a software User Interface (UI) window on a display screen, the method comprising:
    displaying the software UI window on the display screen;
    identifying at least one suitable location on the display screen responsive to an active target window area of a target application UI window
    determining, using the processing device, the software UI window is disposed in a location other than said at least one suitable location on the display screen; and
    positioning, responsive to the determining the software UI window is disposed in the location other than said at least one suitable location on the display screen, the software UI window at said at least one suitable location on the display screen.

2. The method of claim 1,
    wherein said identifying further comprises:
        assuming a default position on the display screen;
        detecting the software UI window is obscuring said active target window area; and
        positioning the software UI window on the display screen responsive to said detecting and
    wherein the detecting further comprises:
        determining the software UI window is disposed adjacent said active target window area; and
        classifying said active target window area as at least one of a large text field or a small-to-medium dialog box, wherein said large text field has at least one of a width greater than 60% of the display screen, a width greater than 1000 pixels, or a height of at least 1.5 times a system font, wherein said small-to-medium dialog box is less than 75% of a width of the display screen.

3. The method of claim 2, wherein said detecting further comprises:
    determining said active target window area is classified as said large text field; and
    determining whether the software UI window may be disposed at a side location adjacent a caret disposed in said active target window area, such that the software UI window is completely visible on the display screen.

4. The method of claim 3, wherein said side location adjacent said caret includes at least one of a bottom right hand side location, a bottom left hand side location, a top right hand side location or a top left hand side location, wherein said bottom right hand side location, said bottom left hand side location, said top right hand side location and said top left hand side location are responsive to said caret and the software UI window.

5. The method of claim 2, wherein said detecting further includes,
    determining said active target window area is classified as said small-to-medium dialog box; and
    determining whether the software UI window may be disposed at a side location adjacent said small to medium dialog box, such that the software UI window is completely visible on the display screen.

6. The method of claim 5, wherein said detecting further includes,
    positioning the software UI window to be disposed adjacent said small-to-medium dialog box such that the software UI window is disposed below a top edge of said small-to-medium dialog box and above a bottom edge of said small-to-medium dialog box.

7. The method of claim 2, wherein said detecting further includes,
    identifying an active control disposed within said active target window area and positioning the software UI window to be disposed adjacently aligned with said active control such that the software UI window is completely visible on the display screen.

8. The method of claim 2, wherein said small-to-medium dialog box includes at least one of a top level window, an application window or a modal dialog window.

9. The method of claim 2, wherein said detecting further includes enabling a command to allow a user to vocally relocate the software UI window to a desired location.

10. The method of claim 2, wherein said large text field has a width less than or equal to 60% of the display screen.

11. The method of claim 2, wherein said large text field has a width greater than 60% of the display screen, a width greater than 1000 pixels, and a height of at least 1.5 times a system font.

12. The method of claim 1, wherein said identifying further includes:
    determining the software UI window is obscuring said active target window area; and
    determining whether the software UI window may be disposed at a side location adjacent said active target window area such that the software UI window is entirely visible on the display screen.

13. The method of claim 12, wherein said side location adjacent said active target window area includes at least one of a right hand side location or a left hand side location, wherein said right hand side location and said left hand side location are responsive to said active target window area, said side location adjacent said active target window area disposed between a top edge of said active target window area and a bottom edge of said active target window area.

14. The method of claim 1, wherein said active target window area is at least one of a control window, a menu window or a dropdown window.

15. The method of claim 1, wherein said determining the software UI window is disposed in a location other than said at least one suitable location on the display screen further comprises:
   determining the software UI window is obscuring at least one of said active target window area or a top level UI window; and
   determining whether the software UI window may be positioned in at least one of a right hand side or a left hand side of said at least one of said active target window area or said top level UI window.

16. A system for implementing a method for positioning a software User Interface (UI) window on a display screen, wherein the system comprises:
   a storage device for storing at least one target software application;
   an input device for entering commands into the system;
   a display device, wherein said display device includes the display screen for displaying the software UI window; and
   a processing device, wherein said processing device is communicated with said storage device, said input device and said display device, such that said processing device receives instructions to cause the software UI window to be displayed on the display screen and implements said at least one target software application via said storage device, said instructions further comprising instructions to:
      cause identification of at least one suitable location on the display screen responsive to an active target window area of a target application UI window:
      cause determination that the software UI window is disposed in a location other than said at least one suitable location on the display screen: and
      cause the software UI window to be positioned at said at least one suitable location on the display screen, responsive to the determination that the software UI window is disposed in the location other than said at least one suitable location on the display screen.

17. The system of claim 16, wherein said storage device is at least one of an optical media device, a magnetic media device, an internal storage device, an external storage device, a removable storage device or a non-removable storage device.

18. The system of claim 16, wherein said input device includes at least one of a microphone, a stylus or a keyboard.

19. The system of claim 16,
   wherein said identification of at least one suitable location on the display screen responsive to the active target window area of the target application UI window further comprises:
      assuming a default position on the display screen;
      detecting whether the software UI window is obscuring said active target window area; and
      positioning the software UI window on the display screen responsive to said detecting; and
   wherein the detecting further comprises:
      determining the software UI window is disposed adjacent said active target window area; and
      classifying said active target window area as at least one of a large text field or a small-to-medium dialog box, wherein said large text field has at least one of a width greater than 60% of the display screen, a width greater than 1000 pixels, or a height of at least 1.5 times a system font, wherein said small-to-medium dialog box is less than 75% of a width of the display screen.

20. A computer-readable storage medium encoded with a machine-readable computer program code, the machine-readable computer program code including instructions for causing a controller to implement a method for positioning a software User Interface (UI) window on a display screen, the method comprising:
   displaying the software UI window on the display screen;
   identifying at least one suitable location on the display screen responsive to an active target window area of a target application UI window
   determining the software UI window is disposed in a location other than said at least one suitable location on the display screen; and
   positioning the software UI window at said at least one suitable location on the display screen, responsive to said determining the software UI window is disposed in a location other than said at least one suitable location on the display screen.

21. The computer-readable storage medium of claim 20, wherein the identifying further comprises:
   assuming a default position on the display screen;
   detecting the software UI window is obscuring said active target window area; and
   positioning the software UI window on the display screen responsive to said detecting;
   wherein the detecting further comprises:
      determining the software UI window is disposed adjacent said active target window area; and
      classifying said active target window area as at least one of a large text field or a small-to-medium dialog box, wherein said large text field has at least one of a width greater than 60% of the display screen, a width greater than 1000 pixels, or a height of at least 1.5 times a system font, and wherein said small-to-medium dialog box is less than 75% of a width of the display screen.

* * * * *